United States Patent Office 3,416,426
Patented Dec. 17, 1968

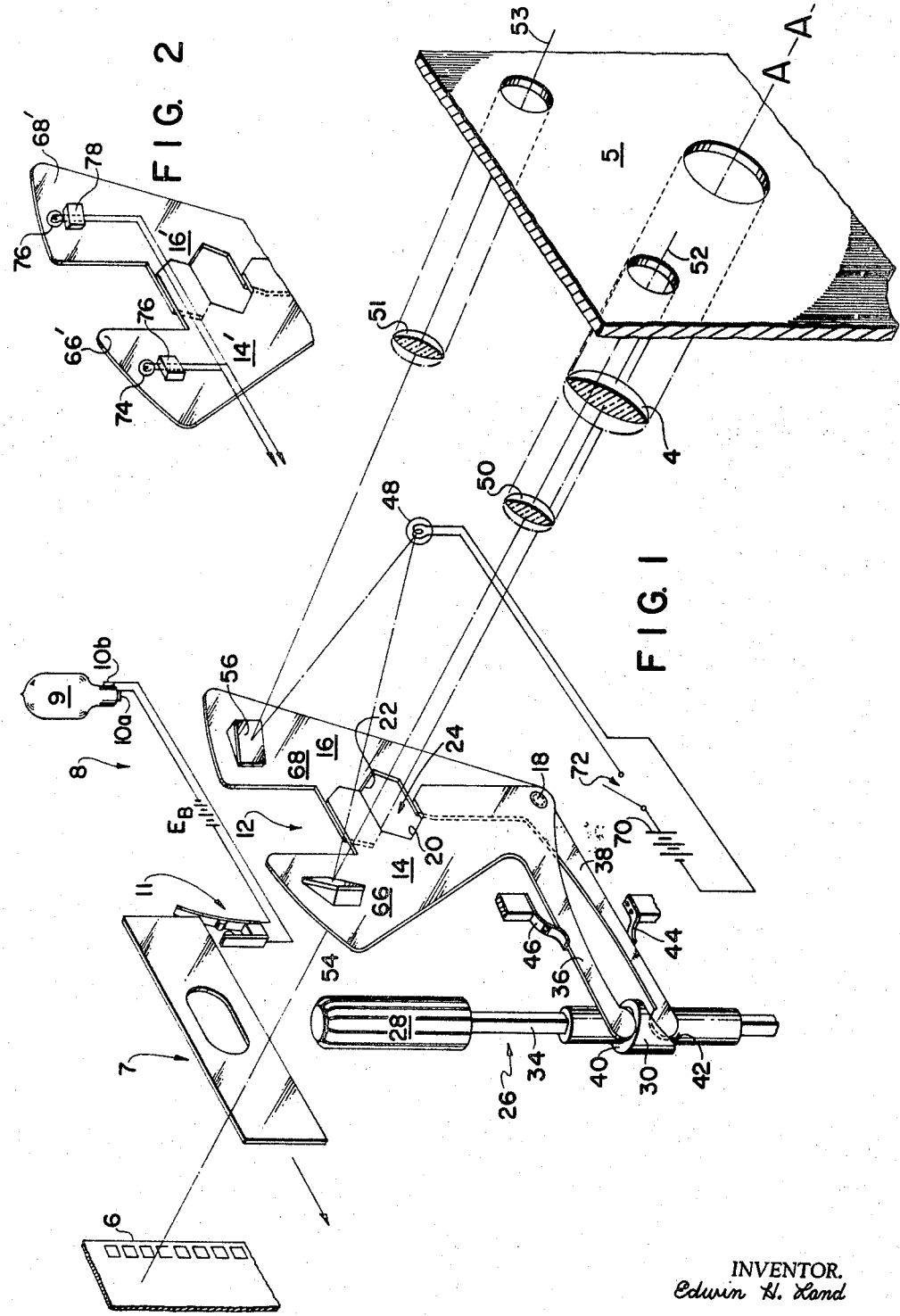

3,416,426
PHOTOGRAPHIC APPARATUS WITH RANGE-FINDER-APERTURE CONTROL
Edwin H. Land, Cambridge, Mass., assignor to Polaroid Corporation, Cambridge, Mass., a corporation of Delaware
Filed Sept. 29, 1966, Ser. No. 582,827
11 Claims. (Cl. 95—44)

This invention relates to photographic apparatus, and more particularly to the combination in a camera of a rangefinder of the projected beams type with aperture control means, the combination serving to correlate the effective exposure aperture, as defined by the aperture control means, with the subject-to-camera distance for flash photography.

As is well known, it is often desirable in flash photography to vary the effective exposure aperture of a camera as a function of the subject-to-camera distance. Many cameras, even some of those in the relatively high price bracket, provide no means for assisting the user in ascertaining subject distances. Such cameras commonly provide a movable pointer coupled to aperture control means for the camera and arranged to cooperate with a subject-to-camera distance scale. With such an aperture selection system the user is required to estimate the magnitude of his separation from his subject. However, certain individuals find it difficult to make distance estimations with a reasonable degree of accuracy.

This invention contemplates the provision in a camera of a rangefinder coupled to aperture control means for the camera in such a way and with such means that an effective aperture appropriate for the subject distance may be selected easily and quickly and with high accuracy.

Accordingly, it is an object of this invention to provide in a photographic camera, apparatus for assisting the user in the selection of an appropriate exposure value in flash photography which is relatively inexpensive, and yet which is highly accurate.

It is another object of this invention to provide in a photographic camera apparatus for use in flash photography which exploits the rangefinding capabilities of a pair of relatively angularly variable projected light beams to aid the user in selecting an effective aperture which is appropriate for a particular subject distance.

Other objects of this invention will in part be obvious and will in part appear hereinafter.

The invention accordingly comprises the apparatus possessing the construction, combination of elements and arrangement of parts which are exemplified in the following detailed disclosure, and the scope of the application of which is indicated in the claims.

For a fuller understanding of the nature and objects of the invention, reference should be had to the following detailed description taken in connection with the accompanying drawing wherein:

FIGURE 1 is a diagrammatic illustration of a camera constructed in accordance with the principles of this invention; and FIG. 2 is a fragmentary diagrammatic illustration of another embodiment of the invention.

Diverse structures may be devised to implement the concepts of the invention. FIGURE 1 of the drawing illustrates one structural embodiment of the invention and FIG. 2 shows another. The embodiments illustrated show only those structural elements which are preferably utilized to carry out the invention, structures not necessary to depict the invention having been eliminated in the interest of clarity. The FIGURE 1 embodiment of the invention may comprise an objective lens 4 mounted in a lens board 5 for imaging photographic subjects on a photosensitive material 6 within a camera. A shutter 7 may be provided as shown diagrammatically in FIGURE 1. A flash circuit 8 may comprise a flash bulb 9 operably engageable with flash terminals 10a, 10b, an electrical power supply $E_B$, and a flash synchronization switch 11 for coordinating the ignition of flash bulb 9 with movement of the shutter 7.

For the purpose of defining an effective exposure aperture through which light is admitted to the photosensitive material 6, aperture control means 12 may be provided. In the FIGURE 1 embodiment the aperture control means 12 is illustrated as comprising a pair of diaphragm blades 14, 16 rotatably mounted upon a pin 18. Contours 20, 22 in diaphragm blades 14, 16 cooperate to define an effective exposure aperture 24.

The diaphragm blades 14, 16 may be adapted to be angularly displaced relative to each other by means of a rotatable operator 26. The operator 26 may include a knob 28 by which an axial cam 30 on operator shaft 34 may be angularly displaced.

Rotary movement of the operator 26 may be translated into an angular displacement of the diaphragm blades 14, 16 through cam follower arms 36, 38 on diaphragm blades 14, 16 which follow opposed camming surfaces 40, 42 on cam 30. A pair of springs 44, 46 may be utilized to maintain the cam follower arms 36, 38, respectively, in engagement with the camming surfaces 40, 42 of cam 30.

For the purpose of assisting the user in the selection of an effective aperture which is appropriate for a flash exposure of known intensity at a particular subject distance, rangefinding means are coupled to the diaphragm blades 14, 16. In accordance with the invention, the rangefinding means may comprise light generating means for generating a pair of intersecting light beams for projection upon a subject to be photographed, and means for effecting relative angular movement of the beams to provide range indications. In the FIGURE 1 embodiment the light generating means is shown as comprising a light source such as a lamp 48, a pair of projection lenses 50, 51 and a pair of mirrors 54, 56 angularly oriented so as to direct light from the lamp 48 through the projection lenses 50, 51, respectively. The lamp 48 and the associated mirrors 54, 56 and lenses 50, 51 are effective to generate and project a pair of collimated light beams 52, 53 from the forward end of a camera with which the illustrated apparatus may be associated.

As is well known, the angular separation of a pair of light beams when the beams are brought into convergence at a particular remote point may be used as an indication of the range of that point. Accordingly, means may be provided for varying the angular displacement of the beams 52, 53 such that the beams may be converged on subjects within a range of subject-to-camera distances. In the illustrated embodiments, the means provided for varying the angular displacement of the beams 52, 53 utilize the fact that real or apparent transverse movement of the light source with respect to the associated projection lens changes the angle by which the beam is deflected by the lens.

In accordance with this invention the mirrors 54, 56 are located on extensions 66, 68 of blades 14, 16, respectively, in order that transverse movement of the blades 14, 16 with respect to the optical axis A—A of objective lens 6 is effective to vary the angular displacement of the beams 62, 64 in coordination with adjustments in the effective aperture defined by blades 14, 16. As the diaphragm blades 14, 16 are moved transversely with respect to the optical axis A—A, the apparent location of the lamp 48 shifts with respect to the associated projection lenses 50, 51 with the result that the angular displacement of the beams with respect to the respective lens axes is altered. By a proper design and calibration of the angular orientation and location of the mirrors 54, 56 on the blade extensions 66, 68 and of the relevant exposure, geometric and electrical parameters in the apparatus, the effective exposure aperture 24 defined by diaphragm blades 14, 16 can be made to be appropriate for a flash exposure of a subject located in the scene at the point of convergence of the beams 62, 64.

Lamp 48 may be energized from a power supply such as a battery 70 through a circuit including a switch 72 preferably located for convenient actuation by the user.

FIG. 2 reveals another structure which may be fabricated in accordance with the principles of the invention. The FIG. 2 embodiment may be constructed similar to the apparatus shown in FIGURE 1 but with a pair of lamps 74, 76 positioned in sockets 78, 80 directly on extension 66', 68' of diaphragm blades 14', 16'. The lamps 74, 76 may be connected in parallel across a source of electrical power such as is shown in FIGURE 1. In other respects the operation and structure of the FIG. 2 embodiment is similar to that of the FIGURE 1 embodiment described above.

Structural implementations other than those described above are within the purview of this invention. For example, the reflecting mirrors 54, 56 or lamps as shown at 74, 76 might be mounted on control members separate from diaphragm blades 14, 16 but coupled thereto such that movement of the diaphragm blades would effect a variation in the angular displacement of the light beams projected from the apparatus. The invention might be adapted for use with aperture control means other than as shown in the drawing. Since these and other changes may be made in the above apparatus without departing from the scope of the invention herein involved, it is intended that all matter contained in the above description or shown in the accompanying drawing shall be interpreted as illustrative and not in a limiting sense.

What is claimed is:

1. A photographic camera including means for assisting in the selection of an appropriate exposure value for flash photography purposes, comprising:
    means defining an exposure aperture of an optical axis for exposing photosensitive material in a camera;
    variable aperture control means registered with said exposure aperture for defining a range of effective apertures;
    light generating means for generating a pair of light beams for projection upon a subject to be photographed; and
    means for effecting relative angular movement of said beams in coordination with adjustments in the effective exposure aperture defined by said aperture control means such that the intersection of the beams occurs at a distance from the camera coordinated with the selection of an effective aperture which is appropriate for a flash exposure of a subject at said distance.

2. The camera defined by claim 1 wherein said light generating means includes light source means and a pair of projection lens means for directing said beams along narrow paths, and wherein said means for effecting the relative angular movement of said beams includes movable means for effecting relative movement of at least one of said beams with respect to the projection lens means acting thereon to alter the convergence angle of the beams.

3. The camera defined by claim 2 wherein said aperture control means is movable transverse to said optical axis and wherein said movable means is carried by said aperture control means.

4. The camera defined by claim 3 wherein said aperture control means comprises a pair of oppositely movable diaphragm blades.

5. The camera defined by claim 4 wherein said movable means comprises at least one mirror positioned on one of said diaphragm blades to reflect light from said light source means through the projection lens means associated therewith.

6. The camera defined by claim 4 wherein said movable means comprises a pair of mirrors each mounted on a respective one of said diaphragm blades for movement therewith to reflect light from said light source means through the respectively associated projection lens means.

7. The camera defined by claim 4 wherein said movable means comprises means for mounting said light source means on at least one of said diaphragm blades for radiating light through the projection lens means associated therewith.

8. The camera defined by claim 4 wherein said light source means comprises two lamps and said movable means includes means for mounting each lamp on a respectively different one of said diaphragm blades for directing light through respective ones of said projection lens means.

9. A photographic camera including means for assisting in the selection of an appropriate exposure value for flash photography purposes, comprising:
    means defining an exposure aperture on an optical axis for exposing photosensitive material in a camera;
    a pair of oppositely movable diaphragm blades cooperating to define a range of effective apertures;
    a pair of light beam generating means each mounted for movement with a respective one of said blades for directing a pair of intersecting light beams toward a subject to be photographed; and
    manually operable means acting on said diaphragm blades for simultaneously varying the effective aperture defined by said diaphragm blades and the positions of said light beam generating means relative to each other, the intersection of said light beams occurring at a distance from the camera interrelated with said diaphragm blades and coordinated with the selection of an effective aperture which is appropriate for a flash exposure of a subject at said distance.

10. A photographic camera including means for assisting in the selection of an appropriate exposure value for flash photography purposes, comprising:
    means defining an exposure aperture on an optical axis for exposing photosensitive material in a camera;
    a pair of oppositely movable diaphragm blades cooperating to define a range of effective apertures;
    light generating means for generating a pair of intersecting light beams for projection upon a subject to be photographed, comprising:
        a pair of projection lenses, and
        a pair of light sources each mounted for movement with a respective one of said blades to direct light through said projection lenses; and
    manually operable means acting on said diaphragm blades for simultaneously varying the effective aperture defined by said diaphragm blades and the positions of said light sources relative to each other and to said respectively associated lenses, the intersection of said light beams occurring at a distance from the camera interrelated with said diaphragm blades and coordinated with the selection of an effective aperture which is appropriate for a flash exposure of a subject at said distance.

11. The apparatus in a photographic camera for assisting in the selection of an appropriate exposure value in flash photography, comprising:
    means defining an exposure aperture on an optical axis for exposing photosensitive material in a camera;
    a pair of oppositely movable diaphragm blades cooperating to define a range of effective apertures;
    light generating means for generating a pair of intersecting light beams for projection upon a subject to be photographed, comprising:
        a light source,
        a pair of projection lenses, and a pair of mirrors, each mounted for movement with a respective one of said blades, said mirrors being angled to reflect light from said source through said projection lenses; and manually operable means acting on said diaphragm blades for simultaneously varying the effective aperture defined by said diaphragm blades and the positions of said mirrors relative to each other and to said respectively associated lenses, the intersection of said light beams occurring at a distance from the camera interrelated with said diaphragm blades and coordinated with the selection of an effective aperture which is appropriate for a flash exposure of a subject at said distance.

References Cited

UNITED STATES PATENTS

| 3,074,335 | 1/1963 | Graves | 95—64 |
| 3,151,535 | 10/1964 | Hahn | 95—64 |
| 3,253,523 | 5/1966 | Hutchison | 95—64 |

NORTON ANSHER, *Primary Examiner.*

CHARLES B. FUNK, *Assistant Examiner.*

U.S. Cl. X.R.

95—64